Figure 1:
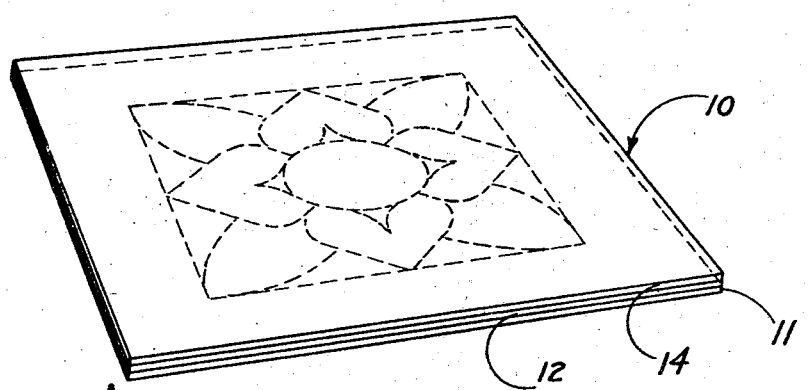

March 4, 1947.　　　T. S. REESE　　　2,416,844
ORNAMENTATION OF RUBBER
Filed Feb. 23, 1942

INVENTOR.
THOMAS S. REESE
BY Bosworth + Sessions
ATTORNEYS.

Patented Mar. 4, 1947

2,416,844

UNITED STATES PATENT OFFICE 2,416,844

ORNAMENTATION OF RUBBER

Thomas S. Reese, University Heights, Ohio, assignor to The Di-Noc Manufacturing Company, Cleveland, Ohio, a corporation of Ohio Application February 23, 1942, Serial No. 431,927

3 Claims. (Cl. 41—33)

This invention relates to the ornamentation of rubber articles and particularly to the decoration of rubber articles by means of transfers bearing the desired design or ornamentation.

It has heretofore been proposed to decorate rubber articles by means of transfers. Attempts have been made, without success, to use ordinary decalcomanias. Also, transfers have been produced in which the designs have been printed with rubber inks, that is, inks in which rubber compounds in solution or suspension have been employed as the vehicle for the pigments. Prior to my present invention, rubber ink transfers were also unsuccessful, the transferred designs deteriorating with age and with the stretching or bending of the rubber base material, and failing to adhere properly thereto.

Heretofore, rubber transfers have been made with rubber inks composed of rubber compounds containing suitable vulcanizing agents and accelerators, the theory being that transfers may be applied to an uncured rubber base and the base and transfer may be simultaneously vulcanized or cured by heat and pressure in the usual manner. Numerous difficulties have arisen with such transfers because of the fact that the vulcanizing agents and accelerators in the transfers may not match the vulcanizing agents and accelerators incorporated in the base rubber material, with the result that when the curing operation takes place the effect of the curing operation is different on the transfers from the effect on the base material. After the completion of the curing operation, the rubber base and the rubber transfer frequently do not have the same characteristics. The transfer may be of less elasticity, for example, with the result that when the rubber is subjected to stretching or bending in service the transfer layer may flake off.

Further difficulties arise from the fact that even at ordinary room temperatures the vulcanizing agents and accelerators have some effect upon the inks and upon the transfers. Thus, neither the inks nor the transfers can be stored for any considerable periods of time without changing their characteristics. The changes taking place at room temperature affect the conditions required to obtain correct results in the subsequent vulcanization of the transfers, while changes in the inks may make the inks difficult to handle during the printing operation. Further, because of the many different types of vulcanizing agents and accelerators used by different manufacturers of rubber goods, it is impractical for a manufacturer of transfers to attempt to duplicate all of the many different combinations of vulcanizing agents and accelerators, hence, attempts have been made to devise ink compounds which will cure properly under widely differing conditions. These attempts have not met with any considerable success but rather have given, at best, only mediocre results.

According to my invention, all of these difficulties may be eliminated and durable transfers in which the rubber of the transfer has the same characteristics as the rubber of the base may be produced. This result is accomplished in the light of my discovery that if a thin layer of uncured rubber, without any vulcanizing agent or accelerator, preferably of the order of not more than .010 inch in thickness, is applied to a heavier layer of uncured or partially cured rubber and the assembly subjected to a curing or vulcanizing operation, the vulcanizing agents and accelerators, if any, of the uncured base material apparently migrate from the base material into the thin adjacent layer to such an extent that they impart to the layer substantially the same characteristics as the base material, particularly insofar as the flexibility and elasticity of the completed article are concerned. In any event, whatever the underlying reasons may be, the thin rubber layer becomes vulcanized and forms, in effect, an integral part of the base material, indistinguishable therefrom except for the presence of pigments.

Based upon my discovery, I have found that by printing the transfer designs in thin layers with ink composed of a liquid rubber vehicle and suitable pigment, without any vulcanizing agents, accelerators or fillers in the rubber vehicle, I am able to produce transfers which can be stored for long periods of time without change or deterioration and which can be cured along with the rubber base material to produce finished articles in which the design is permanently joined to the underlying base material, and in which the rubber of the design has the same characteristics as the underlying base material so that the design will stand up under very severe usage without deterioration, and will last substantially as long as the article itself.

Figure 2:
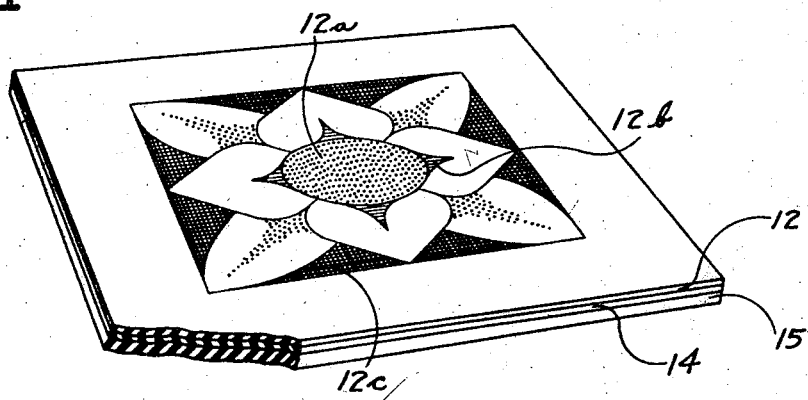
Figure 3:
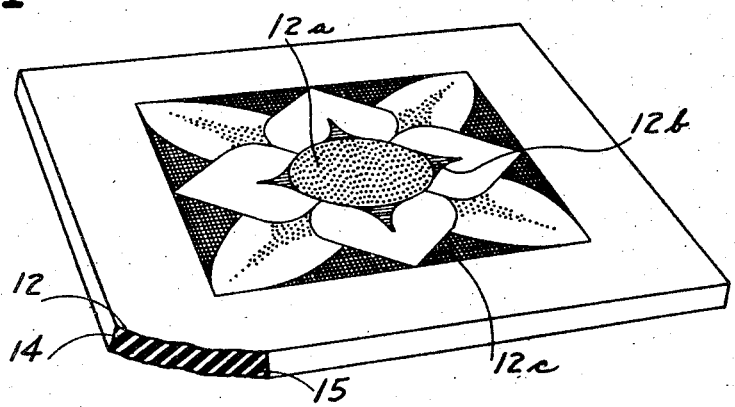

In the drawings, in which I have diagrammatically illustrated a preferred form of my invention, Figure 1 is a perspective view showing a transfer made according to my invention; Figure 2 is a perspective, partly in section, showing the transfer of Figure 1 applied to a rubber base material but before the curing or vulcanizing operation; and Figure 3 is a similar view of the assembly of base and design after the vulcanizing or curing operation.

According to a preferred form of my invention I produce the transfer indicated generally at 10 in Figure 1 by printing upon a suitable base material 11 with ink consisting essentially of suitable pigments carried by a dispersion of rubber in a liquid, as the vehicle. The base material may be of gummed decalcomania paper in which case the paper is removed from the transfer after it is applied to the rubber by wetting the paper and stripping it, or a material suitable for dry stripping such as glassine paper, for example, may be employed.

The rubber dispersion preferably consists of a material of the rubber cement type, such as a solution of milled crepe rubber dissolved in xylol, toluol or naphtha. Dispersions such as emulsions of latex in water may also be employed. Suitable pigments are ground in to the rubber vehicles to give the desired colors. A suitable vehicle of the rubber cement type may be made, for example, by dissolving 11.1% by weight of milled crepe rubber 88.9% by weight of xylol. Inks may be produced by grinding suitable pigments in this vehicle. For example 10% by weight of burnt umber and 90% by weight of the vehicle may be mixed by grinding for 48 hours in a ball mill. Another ink may be produced by grinding 97.5% by weight of vehicle with 2.5% by weight of carbon black for 60 hours in a ball mill. Other pigments of the types ordinarily used in coloring rubber may be employed, the percentages and amount of grinding required varying for different pigments. The inks may be thinned with xylol, toluol or similar materials to proper consistency to fit the printing conditions.

It is to be noted that no vulcanizing agents or accelerators are employed. The ink thus consists essentially of a liquid rubber vehicle, whether the rubber is in the form of latex or milled rubber, with suitable pigments added thereto. The inks may be printed on the paper to form the design bearing layer 12 of Figure 1 by any convenient printing process. For example, plates of the type used in ordinary rotogravure printing may be employed to produce designs embodying continuous tones, different tonal values of the design being diagrammatically illustrated at 12a, 12b and 12c in Figures 2 and 3. Other types of intaglio plates may be used, or the ink may be deposited on the paper through a silk screen stencil. Regardless of the method, the transfers are very thin, preferably not more than about .010 inch in thickness. If desired, several impressions of different colors may be made. After the design has been printed upon the paper, the design may be covered by a continuous coat of rubber 14 as the final operation in completing the transfer. If desired this may be dusted with a zinc or aluminum stearate to prevent sticking as these materials will dissolve into the rubber during the curing operation, without causing any damage.

The transfers are applied to the uncured rubber base material either by simply pressing them against the rubber and then stripping off the paper backing, either with or without the use of water, depending upon the material of the backing, or by first applying a solvent for rubber to the base material, benzene or gasoline, for example, being suitable for this purpose. In Figure 2 the assembly of rubber base material and transfer is illustrated, the base material being indicated at 15, the continuous coating 14 being adjacent the base material and the design bearing layer 12 appearing on the surface.

After the transfer has been applied to the rubber base material 15, the assembly is then subjected to the usual curing or vulcanizing operation. The rubber compound from which the base material is formed contains the usual vulcanizing agents and accelerators, many different materials being employed for these purposes. When the assembly is subjected to heat and pressure during the vulcanizing operation these vulcanizing agents and accelerators apparently migrate from the base material 15 into the layers 14 and 12, imparting to these layers the same characteristics as base material. Thus, the completed article shown in Figure 3 constitutes an integral piece of rubber bearing the desired design, the only difference in the characteristics of the rubber being the presence of the pigments in the outer film. However, the presence of pigments such as those described above does not result in any brittleness in the transferred film.

By employing my invention, designs with continuously varying tones may be applied to rubber goods in such manner that the design becomes in effect, a part of the underlying rubber base material. Inasmuch as the inks and transfers contain no vulcanizing agents or accelerators, they can be stored for long periods of time without deterioration or change, and further, can be employed with any ordinary rubber compounds, using any of the usual methods of curing or vulcanizing.

Throughout the specification and claims, the term "rubber" is intended to include not only natural rubbers of various types, but also synthetic rubbers and rubber-like materials. Those skilled in the art will appreciate that various changes and modifications can be made in my invention without departing from the spirit and scope thereof. Accordingly, it is to be understood that my patent is not limited to the preferred form of my invention described herein, or in any manner other than the scope of the appended claims.

I claim:

1. A transfer comprising a backing sheet detachably carrying a design consisting essentially of a thin layer composed throughout of substantially pure uncured rubber and pigment, without vulcanizing agents or accelerators, and a thin layer of substantially pure rubber without vulcanizing agents or accelerators, overlying said design.

2. A transfer comprising a backing sheet detachably carrying a design consisting essentially of a thin layer composed throughout of substantially pure uncured rubber, without vulcanizing agents, and a pigment, and a thin layer of substantially pure unpigmented rubber without vulcanizing agents, overlying said design.

3. A transfer comprising a backing sheet detachably carrying a printed design consisting essentially of a layer, not exceeding .010 inch in thickness, composed throughout of substantially pure uncured rubber without vulcanizing agents or accelerators, and a pigment, and a thin layer of substantially pure rubber without vulcanizing agents or accelerators, overlying said design.

THOMAS S. REESE.

REFERENCES CITED

The following references are of record in the file of this patent:

UNITED STATES PATENTS

| Number | Name | Date |
|---|---|---|
| 1,640,800 | Peterson | Aug. 30, 1927 |
| 1,537,866 | Morton | May 12, 1925 |
| 1,516,598 | Griffiths | Nov. 25, 1924 |
| 1,597,602 | Klein | Aug. 24, 1926 |
| 1,607,730 | Doughty | Nov. 23, 1926 |
| 1,940,315 | McKay | Dec. 19, 1933 |
| 2,038,556 | Ellis | Apr. 28, 1936 |
| 2,120,393 | Crawford | June 14, 1938 |
| 2,139,068 | Bourdon | Dec. 6, 1938 |
| 2,092,928 | Moody et al. | Sept. 14, 1937 |
| 1,950,196 | Slusher | Mar. 6, 1934 |
| 2,231,083 | Moody et al. | Feb. 11, 1941 |
| 1,552,907 | Binmore | Sept. 8, 1925 |
| 2,036,768 | Morris | Apr. 7, 1936 |
| 2,188,867 | Poschel | Jan. 30, 1940 |
| 1,777,960 | Cadwell | Oct. 7, 1930 |

FOREIGN PATENTS

| Number | Country | Date |
|---|---|---|
| 3,093 | Br. | 1864 |